United States Patent
Giannakopoulos et al.

(10) Patent No.: US 10,774,742 B2
(45) Date of Patent: Sep. 15, 2020

(54) FLARED ANTI-VORTEX TUBE ROTOR INSERT

(71) Applicant: United Technologies Corporation, Farmington, CT (US)

(72) Inventors: Konstantinos Panagiotis Giannakopoulos, Middletown, CT (US); Erica J. Harvie, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/927,659

(22) Filed: Mar. 21, 2018

(65) Prior Publication Data
US 2019/0292981 A1   Sep. 26, 2019

(51) Int. Cl.
*F04D 29/32* (2006.01)
*F02C 6/08* (2006.01)
*F01D 5/08* (2006.01)

(52) U.S. Cl.
CPC ............... *F02C 6/08* (2013.01); *F01D 5/084* (2013.01); *F01D 5/088* (2013.01); *F04D 29/321* (2013.01); *F01D 5/082* (2013.01); *F05D 2230/20* (2013.01); *F05D 2250/232* (2013.01); *F05D 2260/201* (2013.01); *F05D 2260/36* (2013.01)

(58) Field of Classification Search
None
See application file for complete search history.

(56) References Cited

U.S. PATENT DOCUMENTS

| | | | | |
|---|---|---|---|---|
| 4,576,547 A | * | 3/1986 | Weiner | F01D 11/24 415/116 |
| 5,267,832 A | * | 12/1993 | Johnson | F04D 29/644 415/115 |
| 5,305,616 A | * | 4/1994 | Coffinberry | F02C 7/12 60/784 |
| 5,472,313 A | * | 12/1995 | Quinones | F01D 5/082 415/115 |
| 5,525,032 A | * | 6/1996 | Kreis | F01D 5/085 415/1 |
| 6,334,755 B1 | * | 1/2002 | Coudray | F01D 5/088 415/115 |

(Continued)

FOREIGN PATENT DOCUMENTS

| | | |
|---|---|---|
| CN | 107023394 A | 8/2017 |
| DE | 102005034180 A1 | 3/2007 |
| EP | 2787169 A1 | 10/2014 |

OTHER PUBLICATIONS

European Search Report; 19152883.5; dated Aug. 5, 2019; 21 Pages.

*Primary Examiner* — Michael Lebentritt
(74) *Attorney, Agent, or Firm* — Cantor Colburn LLP (57) ABSTRACT

A compressor rotor includes a first disk and a conical section connected to the first disk. The conical section includes at least one flow hole. A bore cavity is defined between the conical section and the first disk. The bore cavity is arranged in fluid communication with the at least one flow hole. An anti-vortex tube is disposed within the at least one flow hole of the conical section and includes at least one feature arranged in contact with a surface of the conical section to restrict movement of the anti-vortex tube out of engagement with the conical section.

18 Claims, 8 Drawing Sheets

(56) References Cited

U.S. PATENT DOCUMENTS

| | | | |
|---|---|---|---|
| 7,011,493 B2* | 3/2006 | Marchi | F01D 9/04 |
| | | | 415/116 |
| 7,390,167 B1 | 6/2008 | Bouiller et al. | |
| 7,448,221 B2* | 11/2008 | Suciu | F01D 5/066 |
| | | | 415/141 |
| 8,177,503 B2* | 5/2012 | Bintz | F01D 5/087 |
| | | | 415/208.1 |
| 10,018,116 B2* | 7/2018 | Ackermann | F01D 5/085 |
| 10,107,206 B2* | 10/2018 | Forcier | F01D 5/087 |
| 10,260,524 B2* | 4/2019 | Hiester | F04D 25/045 |
| 10,280,792 B2* | 5/2019 | Gons | F01D 25/12 |
| 2010/0266387 A1* | 10/2010 | Bintz | F02C 6/08 |
| | | | 415/115 |
| 2010/0266401 A1* | 10/2010 | Bintz | F04D 29/321 |
| | | | 415/211.2 |
| 2013/0280028 A1* | 10/2013 | Benjamin | F01D 5/082 |
| | | | 415/1 |
| 2016/0265371 A1* | 9/2016 | Dale | F23R 3/10 |
| 2019/0195127 A1* | 6/2019 | Bintz | F02C 3/08 |
| 2019/0242407 A1* | 8/2019 | Giannakopoulos | F04D 29/584 |

* cited by examiner

FLARED ANTI-VORTEX TUBE ROTOR INSERT

STATEMENT OF FEDERAL SUPPORT

This invention was made with Government support under Contract Number FA8626-16-C-2139 awarded by the United States Air Force. The Government therefore has certain rights in the invention.

BACKGROUND

Embodiments of this disclosure relate to a thermal management system used in a gas turbine engine, and in an embodiment, to an anti-vortex tube used in a compressor section of a gas turbine engine.

A gas turbine engine generally includes components for channeling air flow through the gas turbine engine along a desired flow path. Conditioning air along the flow path extracts heat from portions of the gas turbine engine to maintain desired operating temperatures. For example, thermal gradients and clearances are controlled in a compressor section of the gas turbine engine to ensure reliable performance and efficiency within the compressor section.

Anti-vortex tubes may be used to direct air within a gas turbine engine to achieve a desired temperature and pressure profile within the engine for performance purposes. An anti-vortex tube may also be used for conditioning and other purposes including scrubbing compressor disks, providing buffer air to bearing compartments, and directing conditioning airflow to portions of the gas turbine engine's turbine section.

Existing anti-vortex tubes are assemblies that commonly include multiple parts such as snap rings and retaining rings in addition to individual tubes. Parts such as snap rings and retaining rings are used to couple the tube assembly to adjoining compressor disks. Such multiple part assemblies add weight to the turbine engine and can add unwanted complexity to the assembly/disassembly processes. For example, a detail balancing of the anti-vortex tubes is done when all the components are assembled together. The balancing requires that each individual tube and tube receiving part be numbered in the event of disassembly to ensure proper balancing of thermal/mechanical stresses upon reassembly.

Accordingly, it is desirable to provide an anti-vortex tube that is mountable at any portion of an engine absent additional retaining components.

BRIEF DESCRIPTION

According to an embodiment, a compressor rotor includes a first disk and a conical section connected to the first disk. The conical section includes at least one flow hole. A bore cavity is defined between the conical section and the first disk. The bore cavity is arranged in fluid communication with the at least one flow hole. An anti-vortex tube is disposed within the at least one flow hole of the conical section and includes at least one feature arranged in contact with a surface of the conical section to restrict movement of the anti-vortex tube out of engagement with the conical section.

In addition to one or more of the features described above, or as an alternative to any of the foregoing embodiments, the at least one feature includes a first feature and a second feature and the first feature restricts movement of the anti-vortex tube in a first direction and the second feature restricts movement of the anti-vortex tube in a second direction.

In addition to one or more of the features described above, or as an alternative to any of the foregoing embodiments, the anti-vortex tube includes a body and the first feature is a flange extending radially from a central portion of the body.

In addition to one or more of the features described above, or as an alternative to any of the foregoing embodiments, a diameter of the flange is greater than a diameter of the at least one flow hole.

In addition to one or more of the features described above, or as an alternative to any of the foregoing embodiments, the second feature is formed at an inlet end of the anti-vortex tube when the anti-vortex tube is inserted within the at least one flow hole.

In addition to one or more of the features described above, or as an alternative to any of the foregoing embodiments, the second feature includes a conical shape.

In addition to one or more of the features described above, or as an alternative to any of the foregoing embodiments, the anti-vortex tube further comprises: a body having an inlet end and an outlet end and a fluid flow path defined by the body and extending between the inlet end and the outlet end.

In addition to one or more of the features described above, or as an alternative to any of the foregoing embodiments, comprising a cut away section formed in the body and extending between the at least one feature and the outlet end such that the fluid flow path is fluidly coupled to the bore cavity upstream from the outlet end.

In addition to one or more of the features described above, or as an alternative to any of the foregoing embodiments, the cut away section includes a first portion and a second portion, the second portion being arranged at an angle to the first portion.

In addition to one or more of the features described above, or as an alternative to any of the foregoing embodiments, the first portion extends along a central plane of the anti-vortex tube.

In addition to one or more of the features described above, or as an alternative to any of the foregoing embodiments, the anti-vortex tube further comprises an anti-rotation feature that cooperates with a portion of the conical hub to restrict rotation of the anti-vortex tube about an axis relative to the conical hub.

In addition to one or more of the features described above, or as an alternative to any of the foregoing embodiments, the portion of the conical hub includes another anti-rotation feature, the other anti-rotation feature being complementary to the anti-rotation feature of the anti-vortex tube.

According to another embodiment, a gas turbine engine includes a compressor section, a combustor section, and a turbine section arranged in fluid communication such that an annular flow path extends axially through the compressor section, the combustor section, and the turbine section. The compressor section includes a conical section including at least one flow hole and a bore cavity defined within the conical section. The bore cavity is arranged in fluid communication with the at least one flow hole. An anti-vortex tube is disposed within the at least one flow hole of the conical section. A contour of the anti-vortex tube restricts movement of the anti-vortex tube relative to the conical section.

According to yet another embodiment, a method of installing an anti-vortex tube relative to a compressor rotor includes inserting an anti-vortex tube into a flow hole formed in the compressor rotor, and transforming an inlet end of the anti-vortex tube inserted within the flow hole from a first configuration to a second configuration to restrict movement of the anti-vortex tube relative to the compressor rotor.

In addition to one or more of the features described above, or as an alternative to any of the foregoing embodiments, transforming the inlet end of the anti-vortex tube from the first configuration to the second configuration includes deforming the inlet end.

In addition to one or more of the features described above, or as an alternative to any of the foregoing embodiments, transforming the inlet end of the anti-vortex tube from the first configuration to the second configuration includes flaring the inlet end into a conical shape.

In addition to one or more of the features described above, or as an alternative to any of the foregoing embodiments, inserting the inlet end of the anti-vortex tube into the flow hole further comprises abutting a feature of the anti-vortex tube against a surface of the compressor rotor.

In addition to one or more of the features described above, or as an alternative to any of the foregoing embodiments, comprising providing a conditioning air flow to a bore cavity of the compressor rotor via the anti-vortex tube.

In addition to one or more of the features described above, or as an alternative to any of the foregoing embodiments, providing a conditioning air flow to a bore cavity of the compressor rotor further comprises imparting a swirl to the conditioning air flow as it passes through the anti-vortex tube.

In addition to one or more of the features described above, or as an alternative to any of the foregoing embodiments, inserting an inlet end of the anti-vortex tube into a flow hole formed in the compressor rotor includes inserting an inlet end of the anti-vortex tube into a flow hole formed in a conical section of the compressor rotor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
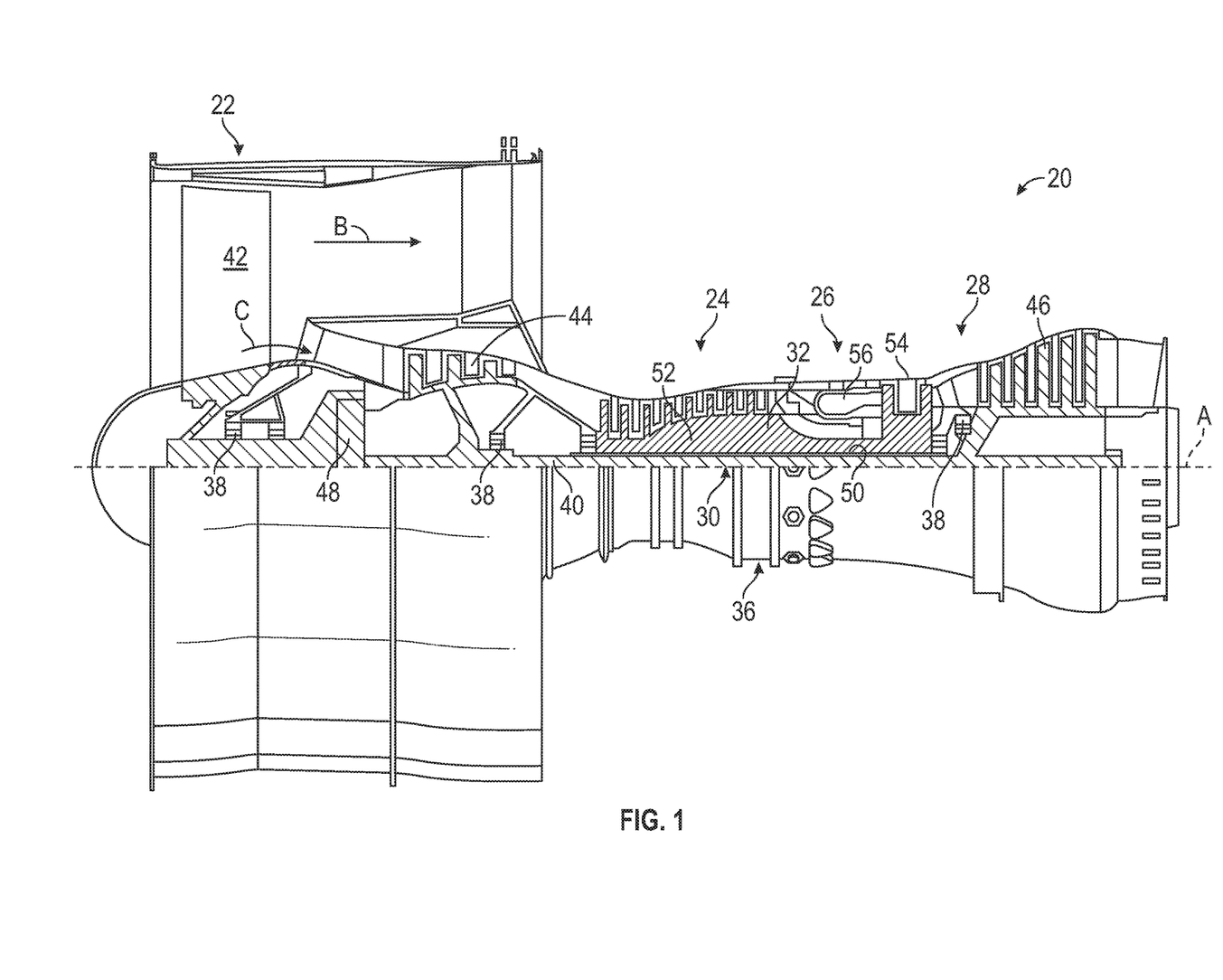
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

Figure 2:
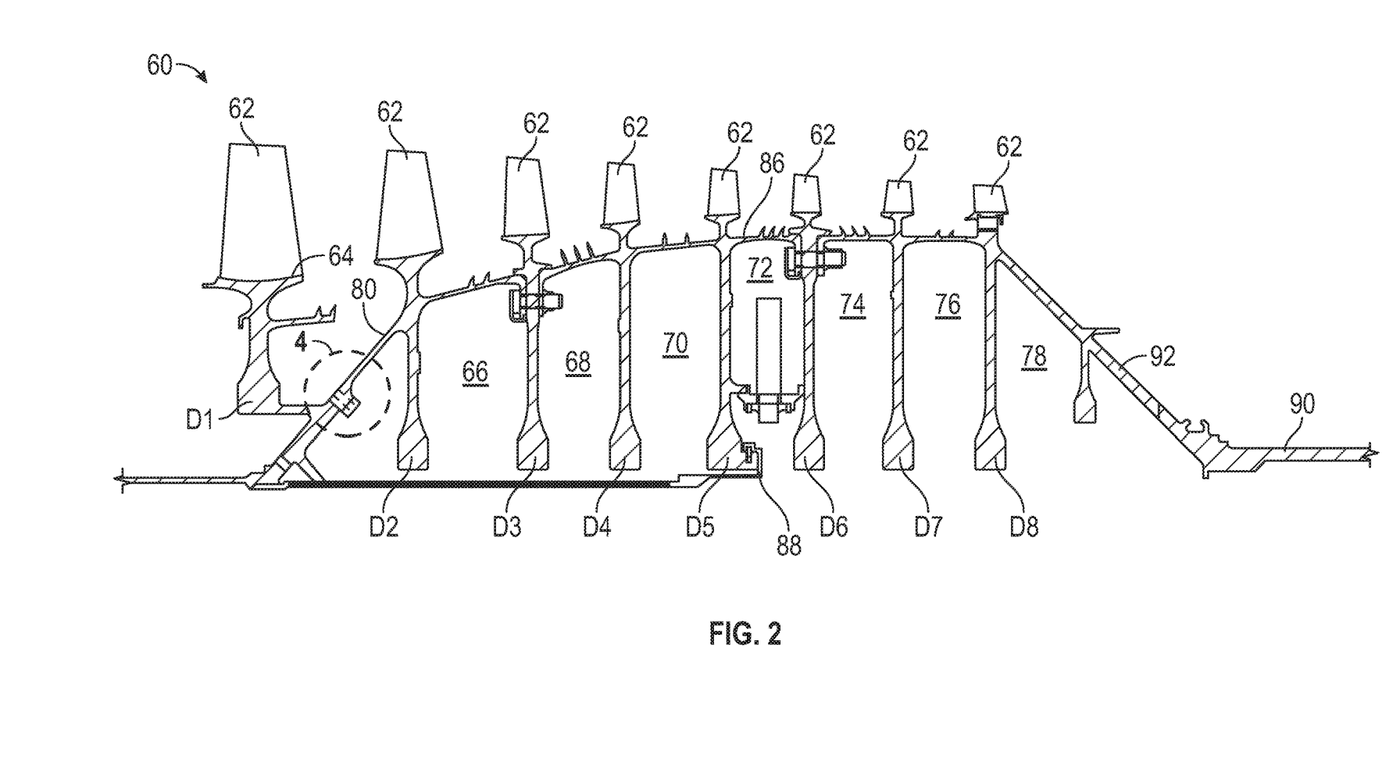
FIG. 2 is a partial view of a compressor section of a gas turbine engine.

Referring now to FIG. 2, an example of a compressor 60 of the turbine engine 20, such as the high pressure compressor 52 for example, is illustrated in more detail. The compressor 60 includes a plurality of disks, D1-D8. Each respective disk D1-D8 may carry one or more rotor blades 62. Each disk 62 includes a rim 64 such that a main gas flow path is formed between the rims of the plurality of disks and a casing (not shown) which surrounds the compressor rotor. Multiple bore cavities 66, 68, 70, 72, 74, 76, and 78 are located between the disk rims and the outer diameter of the tie shaft. These bore cavities 66, 68, 70, 72, 74, 76, and 78 may be divided into a plurality of forward cavities including cavities 66, 68, and 70 and a plurality of aft cavities including cavities 72, 74, 76, and 78.

Figure 3:
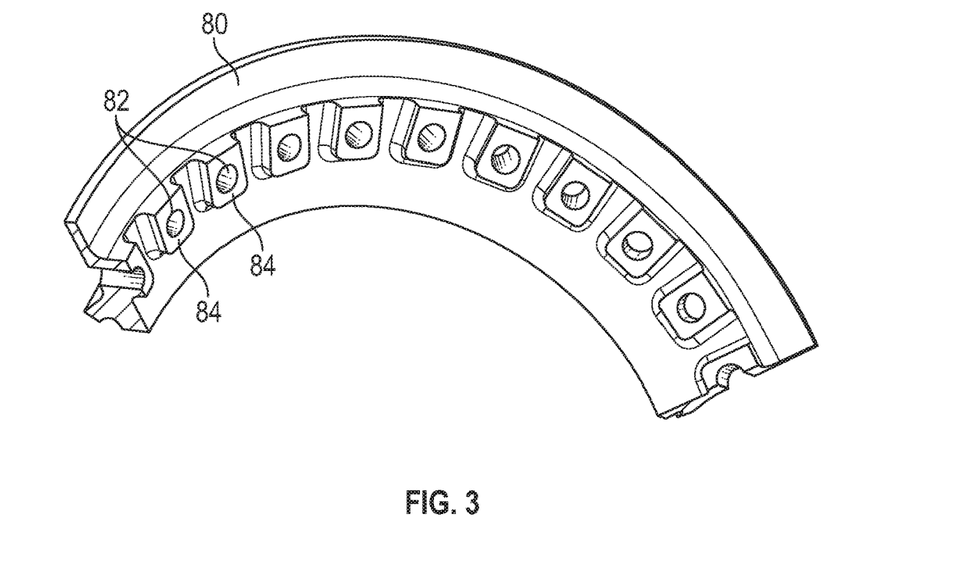
FIG. 3 is a perspective view of a portion of a front hub of the compressor section of FIG. 2.
Figure 4:
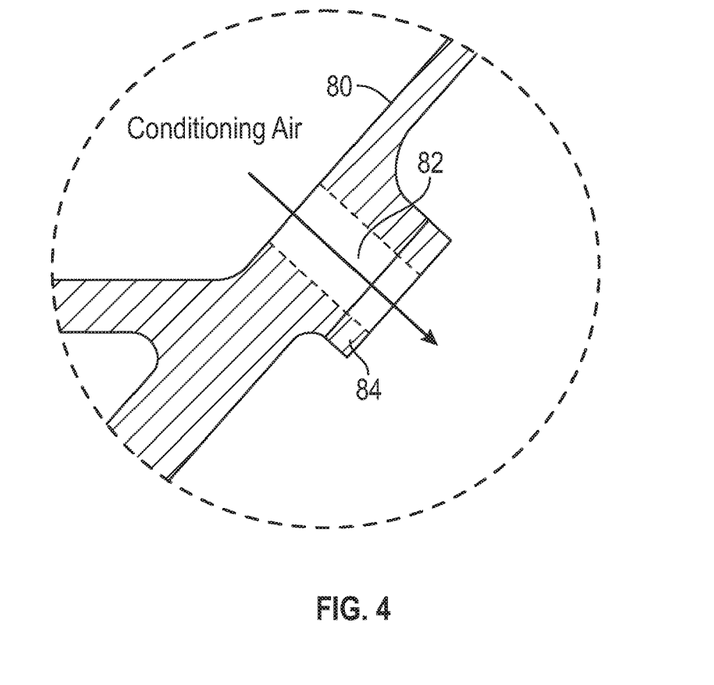
FIG. 4 is an enlarged view of section X of FIG. 2.

A front hub 80 is mounted to the bearing compartment of the compressor 60. As best shown in FIG. 3, the front hub 80 includes a plurality of flow holes 82 through which a supply of conditioning air is delivered to the forward cavities 66, 68, and 70. In existing systems, as shown in FIGS. 2-4, a boss 84 is typically formed at an underside of the front hub 80 adjacent each of the plurality of flow holes 82. The conditioning air provided to the flow holes 82 conditions not only the temperature of the disks D2-D4 arranged in fluid contact therewith, but also the temperature of the bore basket. After having passed through one or more of the forward cavities 66, 68, and 70, the flow of conditioning air exits through one or more radial holes (not shown) formed in the bore basket. In embodiments where a low pressure shaft (not shown) is disposed within the bore basket, the flow of conditioning air passing through the radial holes may mix with an intershaft flow of cooling air passing between the tie shaft and the low pressure shaft.

The aft cavities 72, 74, 76, and 78 are conditioned, such as by bleeding air from the main gas path via one or more radial bleed slots 86 located in a disk rim 64. The aft cavities 72, 74, 76, and 78 are isolated from the forward cavities 66, 68, and 70 by the bore basket rotor coupling 88 extending between the aft side of disk R4 and the outer diameter of the bore basket. The majority of the conditioning air within the aft cavities passes 72, 74, 76, and 78 under disk D8 and exits through one or more exit holes (not shown) formed in the foot 90 of a rear hub 92 mounted to the bearing compartment. This flow from through the rear hub 92 may then be provided to the downstream high pressure turbine or a customer bleed port.

The air provided to the aft cavities 72, 74, 76, and 78 is typically hotter and at a higher pressure than the conditioning air provided to the forwards cavities 66, 68, and 70. The conditioning flow of the aft cavities 72, 74, 76, and 78 not only conditions the temperature of the disks associated therewith, but also serves as turbine conditioning and blade conditioning air.

With reference now to FIGS. 5-9, in an embodiment, an anti-vortex tube 100 is arranged within at least one of the plurality of flow holes formed in a conical portion of the compressor 60, such as the flow holes 92 formed in the front hub 80. Alternatively, or in addition, an anti-vortex tube 100 may be arranged within at least one of the exit holes formed in the rear hub 92. The anti-vortex tube 100 includes a body 102 having an inlet end 104, an outlet end 106, and a generally hollow interior 108 defining a fluid flow path extending through the body 102 between an opening 110 at the inlet end 104 and an opening 112 at the outlet end 106. In an embodiment, the body 102 of the anti-vortex tube 100 is generally cylindrical in shape; however, any shape having desirable flow characteristics is contemplated herein. Further, the body 102 of the anti-vortex tube 100 may be a unitary component formed from any suitable material, such as metal, plastic, or a composite for example.

Figure 5:
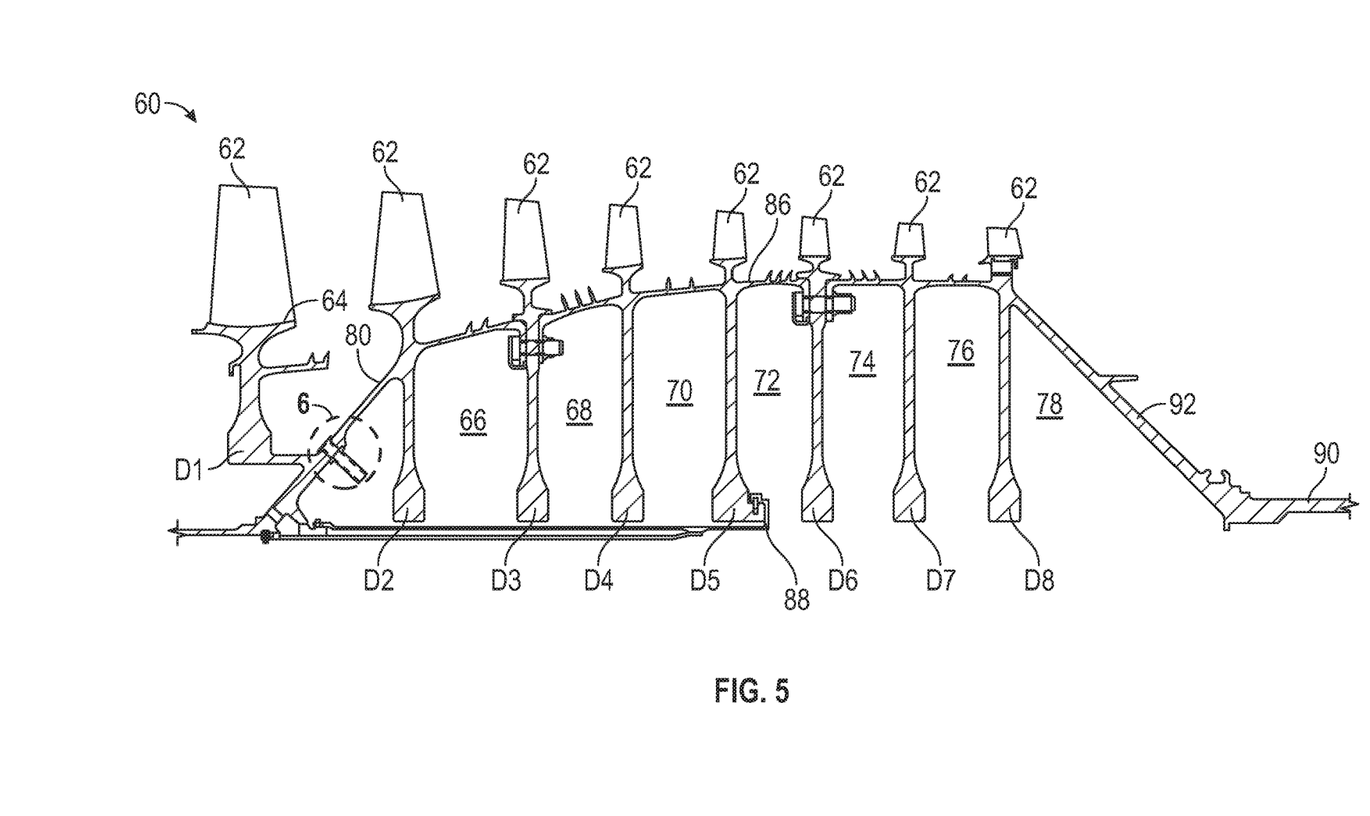
FIG. 5 is a partial view of a compressor section of a gas turbine engine according to an embodiment.
Figure 6:
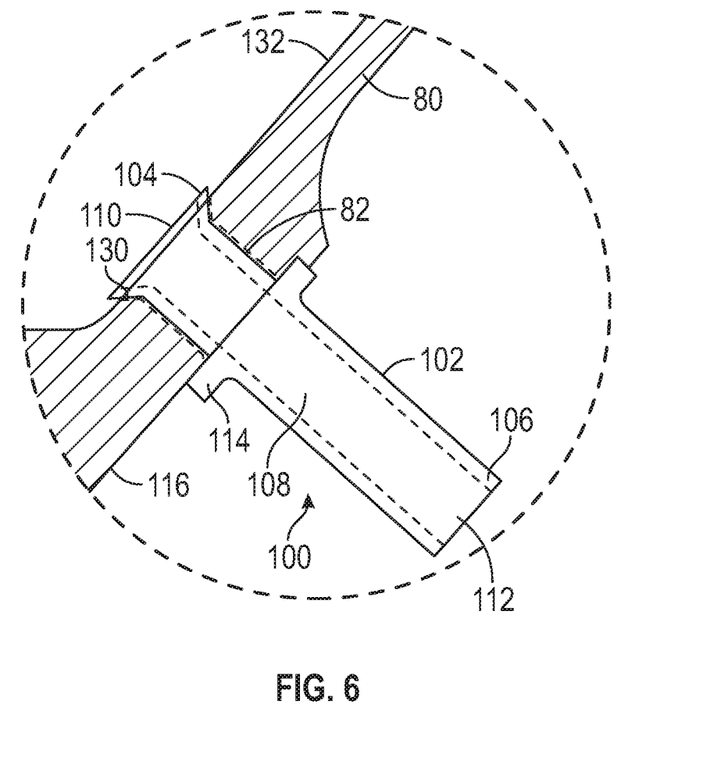
FIG. 6 is an enlarged view of section Y of FIG. 5 according to an embodiment.

In an embodiment, the anti-vortex tube 100 additionally includes a flange 114 extending radially outwardly from the body 102 at a central location disposed between the inlet end 104 and the outlet end 106. A diameter of the flange 114 is greater than a diameter of the flow hole 82 and may abut a surface of the hub 80 when the anti-vortex tube 100 is installed within the compressor 60. As shown, the flange 114 is adapted to abut an interior surface 116 of the hub 80 arranged in fluid communication with the forward cavities 66, 68, and 70. Inclusion of the flange 114 eliminates the need for a boss surrounding each of the plurality of holes 82 as formed in an existing hub 80.

Figure 8:
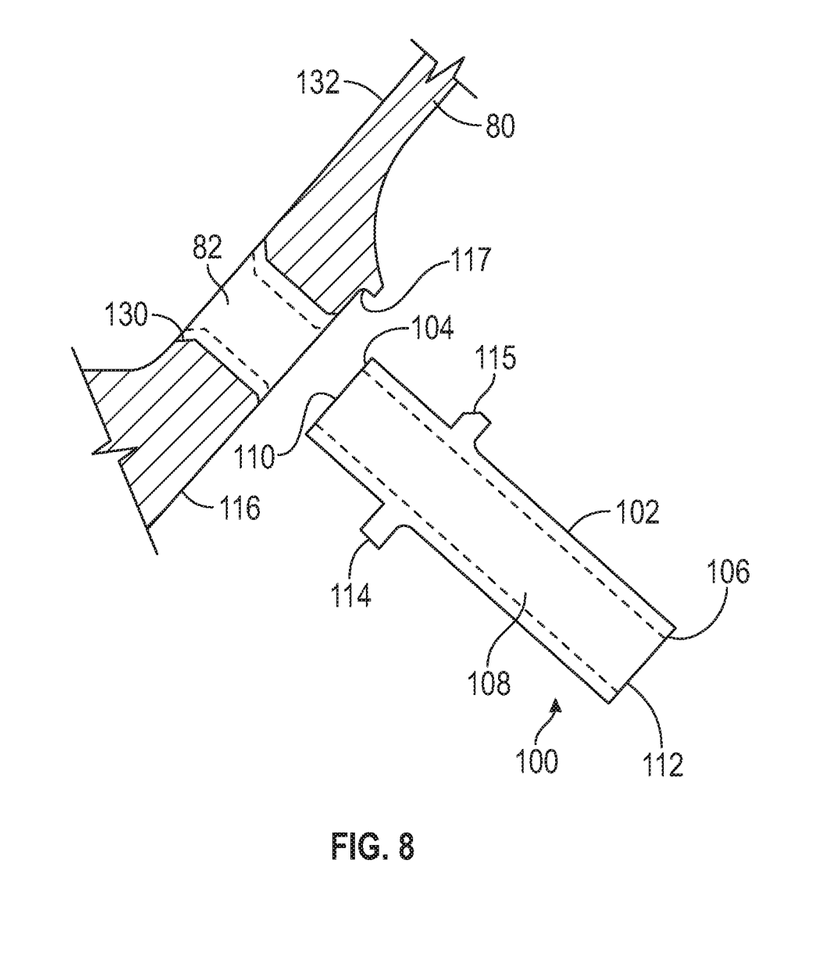
FIG. 8 is a cross-sectional view of section Y during installation of the anti-vortex tube according to an embodiment.
Figure 9A:
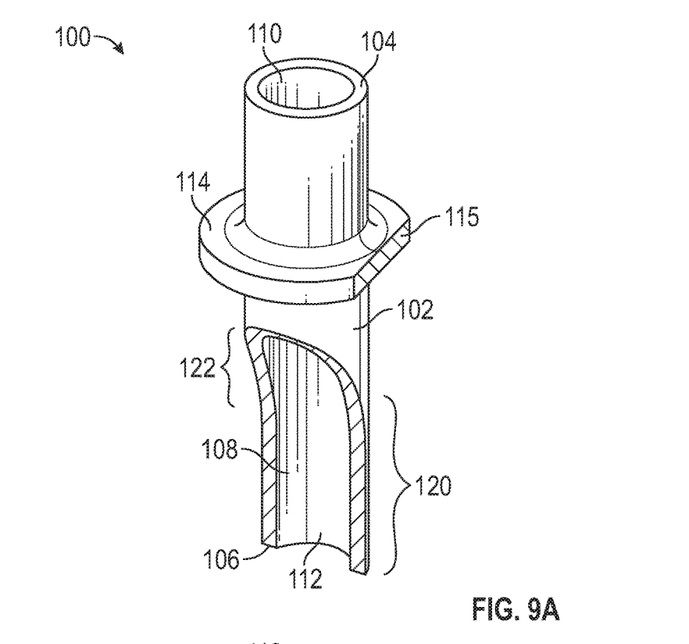
FIG. 9A is a perspective view of an anti-vortex tube prior to installation in a gas turbine engine according to an embodiment.
Figure 9B:
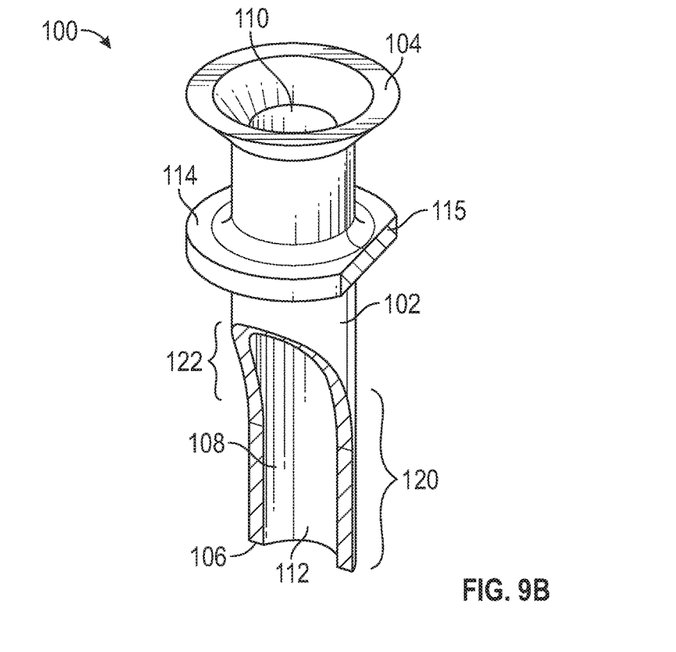
FIG. 9B is a perspective view of an anti-vortex tube after installation in a gas turbine engine according to an embodiment.

As best shown in FIGS. 8-9, in an embodiment, the anti-vortex tube 100 includes an anti-rotation feature 115 to restriction rotation of the tube 100 once, such as relative to the hub 80 for example. In the illustrated, non-limiting embodiment, the anti-rotation feature 115 is formed into a portion of the flange 114, such as by cutting away a portion of the flange 114. When the anti-vortex tube 100 is inserted into a hole 82 formed in the compressor hub 80, the tube is positioned such that the anti-rotation feature 115 abuts or aligns with a corresponding feature 117 extending from the surface 116 of the hub 80. The anti-rotation feature 115 of the tube 100 and the corresponding feature 117 formed in the hub 80 are generally complementary in size and shape and may be configured such that the alignment or engagement of the features 115, 117 prevents or restricts rotation of the anti-vortex tube 100 relative to the hub 80.

Figure 7A:
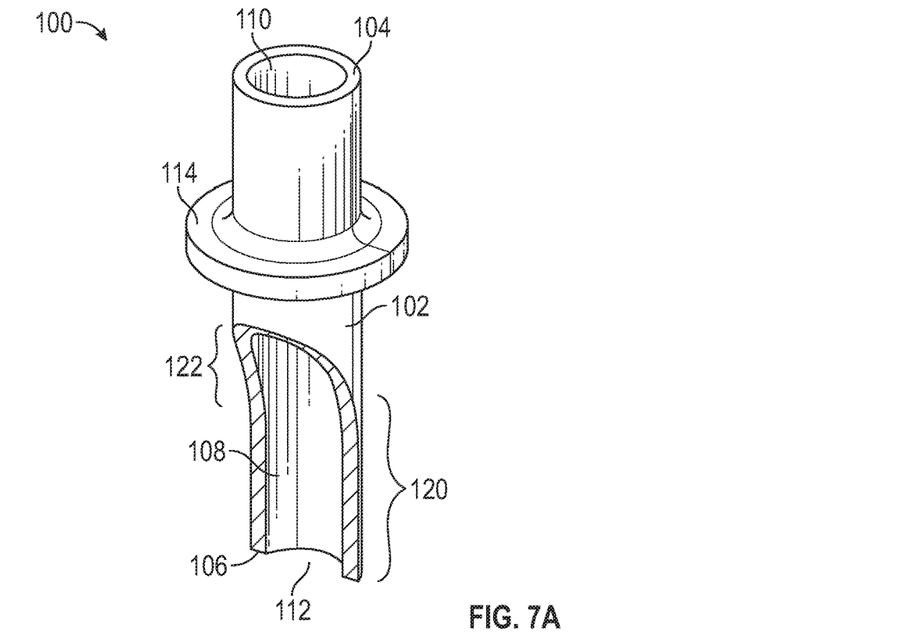
FIG. 7A is a perspective view of an anti-vortex tube prior to installation in a gas turbine engine according to an embodiment.
Figure 7B:
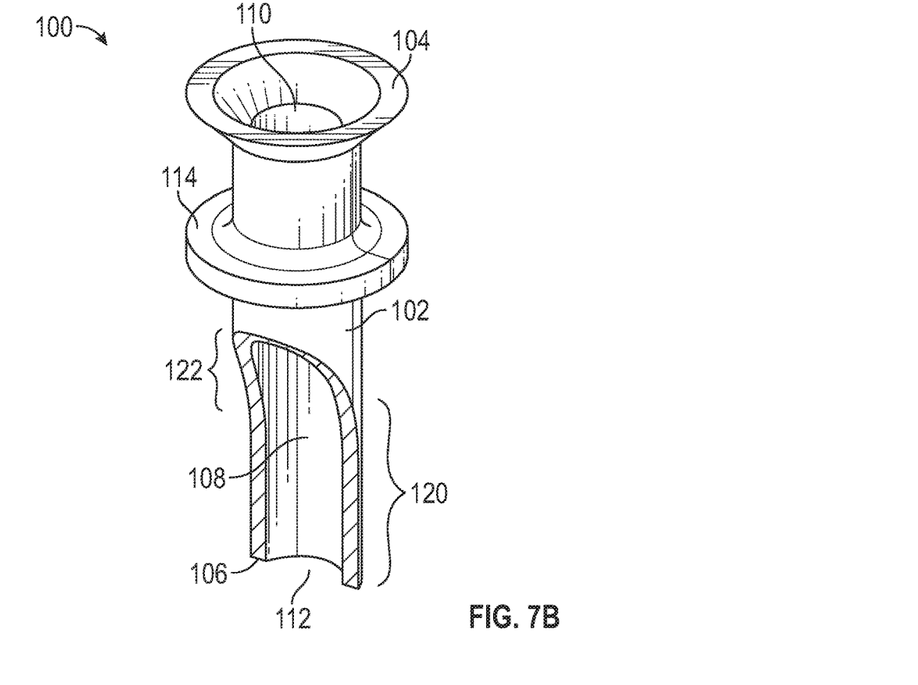
FIG. 7B is a perspective view of an anti-vortex tube after installation in a gas turbine engine according to an embodiment.

In the illustrated, non-limiting embodiment, a portion of the body 102 located between the flange 114 and the outlet end 106 is cut away such that portion of the fluid flow path associated therewith is in fluid communication with the ambient atmosphere adjacent the body 102. As shown, a first portion 120 of the cut away, extends from the outlet end 106 along a central plane of the anti-vortex tube 100. A second portion 122 of the cut away extends from an end of the first portion 120 toward the flange 114 at an angle, such as between a 30 degree and a 60 degree angle for example. However, any angle is within the scope of the disclosure. By forming the anti-vortex tube 100 with such a configuration, a swirl may be imparted to the air as it passes through the anti-vortex tube 100, thereby aiding the diffusion of the air into the forward cavities 66, 68, and 70.

As manufactured, the anti-vortex tube 100, illustrated in FIGS. 7A and 9A, has an inlet end 104 that is generally circular in shape and has an outer diameter substantially equal to or slightly smaller than the diameter of a corresponding flow hole 82. In this first configuration, the inlet end 104 of the body 102 is receivable within one of the plurality of flow holes 82 formed in the hub 80. In the illustrated, non-limiting embodiment, best shown in FIG. 6, the flow hole 82 into which the inlet end 104 anti-vortex tube 100 is inserted includes a chamfer or has countersink 130 formed in the 132 surface of the hub 80. However, embodiments where the hole 82 is a straight through hole, or has another configuration are also within the scope of the disclosure.

To affix the anti-vortex tube 100 to the hub 80 and restrict movement thereof relative to the hole 82, a manufacturing process may transform the inlet end 104 of the body 102 to a second configuration while the body 102 is positioned within the hold 82. In an embodiment, after the inlet end 104 of the body 102 is inserted into the hole 82, the inlet end 104 is then machined or stamped to form a flared or conical shape, as best shown in FIGS. 7B and 9B. The machining process applied to the inlet end 104 is adapted to increase an outer diameter of the body 102 at the inlet end 104. In an embodiment, the flare or conical shape formed in the inlet end 104 of the body 102 is complementary to or substantially identical to the chamfer 130 formed in the adjacent portion of the hole 82. Accordingly, after the machining process and when the anti-vortex tube 100 is in the second configuration, the outer diameter of the body 102 at the inlet end 104 is greater than the inner diameter at the narrowest portion of the hole 82. Because of this, the shaped inlet end 104 and the flange 114 cooperate to restrict movement of the anti-vortex tube 100 relative to the conical portion of the compressor 60 in both a first direction and a second, opposite direction.

Use of an anti-vortex tube 100 as illustrated and described herein reduces the weight of the compressor and eliminates stress riser locations formed in the conical portions of the compressor rotor. In addition, the design of the anti-vortex tube 100 may be optimized to control a pressure of the air provided to the cavities affected by the anti-vortex tube.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compressor rotor comprising:
   a first disk;
   a conical section connected to the first disk, the conical section including at least one flow hole;
   a bore cavity defined between the conical section and the first disk; the bore cavity being arranged in fluid communication with the at least one flow hole; and
   an anti-vortex tube disposed within the at least one flow hole of the conical section, the anti-vortex tube including at least one feature arranged in contact with a surface of the conical section to restrict movement of the anti-vortex tube out of engagement with the conical section, wherein the at least one feature includes a first feature arranged in contact with a first surface of the conical section to restrict movement of the anti-vortex tube in a first direction and a second feature arranged in contact with a second, opposite surface of the conical section to restrict movement of the anti-vortex tube in a second direction.

2. The compressor rotor of claim 1, wherein the anti-vortex tube includes a body and the first feature is a flange extending radially from a central portion of the body.

3. The compressor rotor of claim 2, wherein a diameter of the flange is greater than a diameter of the at least one flow hole.

4. The compressor rotor of claim 1, wherein the second feature is formed at an inlet end of the anti-vortex tube when the anti-vortex tube is inserted within the at least one flow hole.

5. The compressor rotor of claim 4, wherein the second feature includes a conical shape.

6. The compressor rotor of claim 1, wherein the anti-vortex tube further comprises:
   a body having an inlet end and an outlet end; and
   a fluid flow path defined by the body and extending between the inlet end and the outlet end.

7. The compressor rotor of claim 6, further comprising a cut away section formed in the body and extending between the at least one feature and the outlet end such that the fluid flow path is fluidly coupled to the bore cavity upstream from the outlet end.

8. The compressor rotor of claim 7, wherein the cut away section includes a first portion and a second portion, the second portion being arranged at an angle to the first portion.

9. The compressor rotor of claim 7, wherein the first portion extends along a central plane of the anti-vortex tube.

10. The compressor rotor of claim 1, wherein the anti-vortex tube further comprises an anti-rotation feature that cooperates with a portion of the conical section to restrict rotation of the anti-vortex tube about an axis relative to the conical hub.

11. The compressor rotor of claim 10, wherein the portion of the conical section includes another anti-rotation feature, the other anti-rotation feature being complementary to the anti-rotation feature of the anti-vortex tube.

12. A gas turbine engine, comprising:
   a compressor section, a combustor section, and a turbine section arranged in fluid communication such that an annular flow path extends axially through the compressor section, the combustor section, and the turbine section;
   the compressor section including:
      a conical section including at least one flow hole;
      a bore cavity defined within the conical section, the bore cavity being arranged in fluid communication with the at least one flow hole; and
      an anti-vortex tube disposed within the at least one flow hole of the conical section, wherein a contour of the anti-vortex tube restricts movement of the anti-vortex tube relative to the conical section.

13. A method of installing an anti-vortex tube relative to a compressor rotor comprising:
   inserting an anti-vortex tube into a flow hole formed in the compressor rotor; and
   transforming an inlet end of the anti-vortex tube inserted within the flow hole from a first configuration to a second configuration to restrict movement of the anti-vortex tube relative to the compressor rotor; and
   providing a conditioning air flow to a bore cavity of the compressor rotor via the anti-vortex tube.

14. The method of claim 13, wherein transforming the inlet end of the anti-vortex tube from the first configuration to the second configuration includes deforming the inlet end.

15. The method of claim 14, wherein transforming the inlet end of the anti-vortex tube from the first configuration to the second configuration includes flaring the inlet end into a conical shape.

16. The method of claim 13, wherein inserting the inlet end of the anti-vortex tube into the flow hole further comprises abutting a feature of the anti-vortex tube against a surface of the compressor rotor.

17. The method of claim 10, wherein providing a conditioning air flow to a bore cavity of the compressor rotor further comprises imparting a swirl to the conditioning air flow as it passes through the anti-vortex tube.

18. The method of claim 10, wherein inserting an inlet end of the anti-vortex tube into a flow hole formed in the compressor rotor includes inserting an inlet end of the anti-vortex tube into a flow hole formed in a conical section of the compressor rotor.

* * * * *